United States Patent [19]

Harrington et al.

[11] Patent Number: 5,723,545
[45] Date of Patent: Mar. 3, 1998

[54] BLENDS OF A SEMI-CRYSTALLINE POLYMER AND ELASTIC α-OLEFIN/CYCLIC OLEFIN COPOLYMERS

[75] Inventors: Bruce Allan Harrington, Houston; Patrick Brant, Seabrook; Anthony Jay Dias, Houston, all of Tex.

[73] Assignee: Exxon Chemical Patents Inc., Houston, Tex.

[21] Appl. No.: 740,890

[22] Filed: Nov. 4, 1996

Related U.S. Application Data

[63] Continuation of Ser. No. 539,487, Oct. 6, 1995, which is a continuation of Ser. No. 324,287, Oct. 14, 1994, abandoned, which is a continuation-in-part of Ser. No. 5,676, Jan. 19, 1993.

[51] Int. Cl.$^6$ ................................................. C08L 45/00
[52] U.S. Cl. .................. 525/194; 525/210; 525/211; 525/216; 525/387; 526/281; 526/308; 522/160
[58] Field of Search ................................ 525/194, 210, 525/211, 216, 387; 522/160; 526/281, 308

[56] References Cited

U.S. PATENT DOCUMENTS

| | | | |
|---|---|---|---|
| 2,934,527 | 4/1960 | Mckay et al. | 260/88 |
| 3,313,786 | 4/1967 | Kahle et al. | 260/79 |
| 3,876,595 | 4/1975 | Ogura et al. | 260/80 |
| 4,614,788 | 9/1986 | Kajiura et al. | 526/281 |
| 4,918,133 | 4/1990 | Moriya et al. | 524/518 |
| 4,990,559 | 2/1991 | Shiraki et al. | 524/518 |
| 5,008,356 | 4/1991 | Ishimaru et al. | 526/281 |
| 5,087,677 | 2/1992 | Brekner et al. | |
| 5,292,811 | 3/1994 | Murata et al. | 525/194 X |

FOREIGN PATENT DOCUMENTS

| | | |
|---|---|---|
| 0 203 799 A1 | 12/1986 | European Pat. Off. |
| 0 283 164 A2 | 9/1988 | European Pat. Off. |
| 0 407 870 A2 | 1/1991 | European Pat. Off. |
| 0 496 193 A1 | 7/1992 | European Pat. Off. |
| 0504418 | 9/1992 | European Pat. Off. .......... 526/134 |
| 214 623 | 10/1984 | Germany. |
| 2 47157 | 2/1990 | Japan. |
| 2 276816 | 11/1990 | Japan. |
| 3 76911 | 4/1991 | Japan. |
| 3 188145 | 8/1991 | Japan. |
| 3 203945 | 9/1991 | Japan. |
| 3 203950 | 9/1991 | Japan. |
| 3 210348 | 9/1991 | Japan. |
| 3 207755 | 9/1991 | Japan. |
| 2551145 | 8/1996 | Japan. |
| WO 92/06123 | 4/1992 | WIPO. |
| WO 92/16564 | 10/1992 | WIPO. |
| WO 92/16585 | 10/1992 | WIPO. |

*Primary Examiner*—Fred Teskin
*Attorney, Agent, or Firm*—Douglas W. Miller; Catherine L. Bell; Gerald D. Malpass

[57] ABSTRACT

Blends of semi-crystalline polymers with rubbery thermoplastic copolymers are provided. The rubbery thermoplastic copolymers are elastic at temperatures above their Tg's and properties similar to thermoplastic elastomers and surface tensions 5 dynes/cm or more different, preferably greater than the surface tension of the semi-crystalline polymer. Improved properties include good elastic recovery, toughness, and high elasticity without significant loss in optical properties.

21 Claims, 1 Drawing Sheet

BLENDS OF A SEMI-CRYSTALLINE POLYMER AND ELASTIC α-OLEFIN/CYCLIC OLEFIN COPOLYMERS

CROSS REFERENCE TO RELATED APPLICATIONS

This Application is a Continuation of allowed application Ser. No. 08/539,487, filed Oct. 6, 1995, pending, which is a Continuation of abandoned Application Ser. No. 08/324,287 filed on Oct. 14, 1994, abandoned, which is a Continuation-In-Part of pending Application Ser. No. 08/005,676 filed Jan. 19, 1993.

FIELD OF THE INVENTION

This invention relates to blends of crystalline or semi-crystalline polymers, such as polypropylene, with predominantly amorphous, elastomeric copolymers that have a packing length greater than that of the host polymer. These copolymers, when blended with semi-crystalline homopolymers such as polypropylene act to toughen the homopolymer without detrimentally affecting the surface properties of the semi-crystalline homopolymer.

BACKGROUND OF THE INVENTION

Semi-crystalline polymers such as polypropylene are versatile polymers useful in many applications since their crystallinity imparts desirable mechanical properties such as stiffness. They suffer however from brittleness in certain applications. One of the methods used to reduce the brittleness of semi-crystalline polymers is to blend them with low glass transition temperature (Tg) elastomers such as ethylene-propylene rubber or ethylene-propylene-diene modified terpolymers (EPRs and EPDMs). These blends are less brittle and provide an improved impact resistance, however they often suffer from reduced gloss, haze, and poor tactile quality, as well as decreased flexural modulus when these properties are compared to the original semi-crystalline homopolymer. One reason for this loss of surface properties has to do with chain flexibility. Both the semi-crystalline polymers and the rubber copolymers that are blended with them comprise very flexible chains. They have similar packing lengths as defined and disclosed in Fetters, L. J., Lohse, D. J., Richter, D., Witten, T. A., and Zirkel, A. *Macromolecules*, 1994, and Brant, P., Karim, A., Sikka, M., and Bates, F. S., *J. Poly. Sci., Poly. Phys. Ed.* 1994, incorporated by reference herein. Because of their similar flexibility and packing lengths, both polymers can reside at interfaces and surfaces with similar ease, i.e. when the chains come to an interface or surface, they can fold themselves to fit along the surface, or fold themselves to return to the bulk of the polymer without much trouble. Hence, there exists a roughly equal probability that both the rubber polymer (rubber phase) and the semi-crystalline polymer (continuous phase) of the blend can reside at the surface. In turn, two phases on the surface of a polymer contributes to a decrease in gloss and an increase in haze. Therefore, there exists a need in the art to provide blends of semi-crystalline polymers with impact modifying rubbers that achieve a balance of useful mechanical properties and desirable surface properties.

SUMMARY OF THE INVENTION

In accordance with the present invention, blends comprising a semi-crystalline polymer and a rubbery thermoplastic copolymer having good strength and surface properties without significant loss of optical or tensile properties are provided.

DETAILED DESCRIPTION OF THE INVENTION

Figure 1:
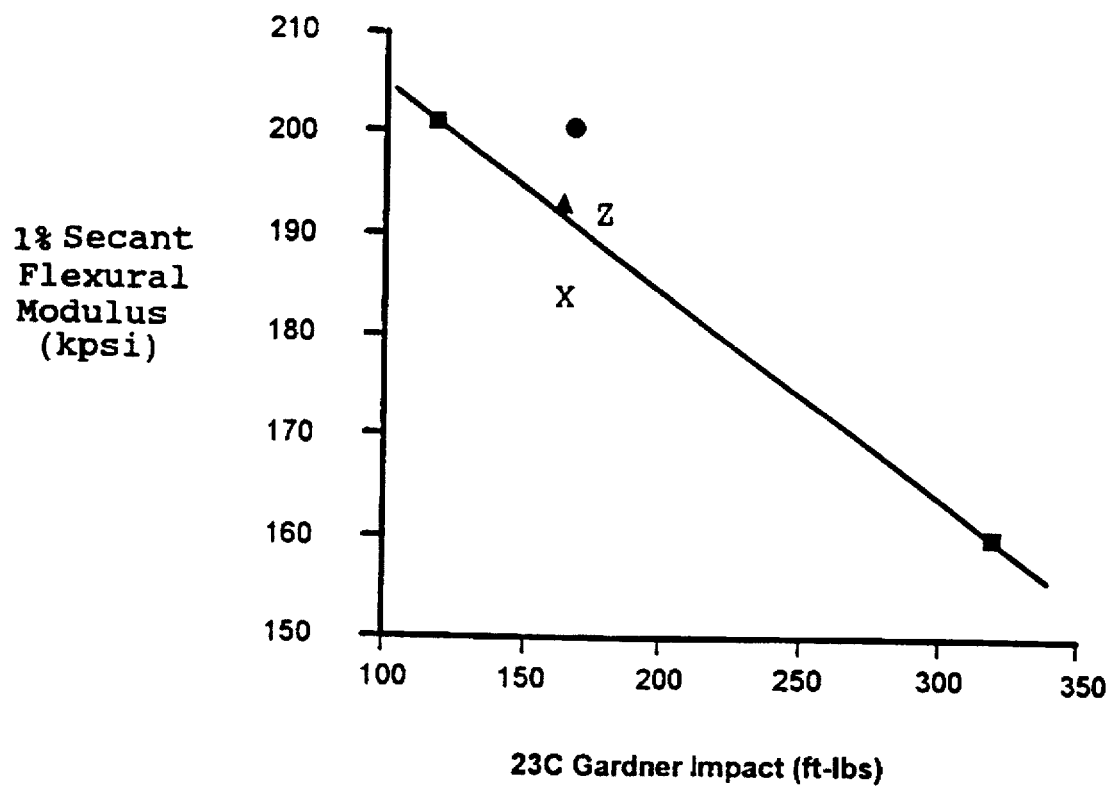
FIG. 1 is a plot of 1% Secant Flexural Modulus vs. 23° C. Garner Impact for neat polypropylene and blends P, Q, R and S.

The present invention relates to blends of a semi-crystalline polymer, such as polypropylene, with a rubbery copolymer with a significantly different surface tension, preferably a difference of 3 dynes per centimeter or more. In a preferred embodiment the rubbery thermoplastic copolymer has a surface tension 3 or more dynes/cm greater than the surface tension of the semi-crystalline polymer, even more preferably 5 dynes/cm greater, even more preferably 8 dynes/cm greater, even more preferably 10 dynes/cm greater. These blends have superior strength, haze and gloss properties, among others. In particular these blends have increased impact resistance without a significant reduction in flexural modulus and gloss.

Hereinafter the use of the term polypropylene is merely exemplary, and is not intended to limit the scope of the invention in any way. Those of ordinary skill in the art will recognize that other semi-crystalline polymers comprising $C_2$ to $C_{40}$ α-olefins would be used in a similar fashion.

In one set of embodiments the rubbery thermoplastic copolymer is typically present in the blend in amounts of up to about 90 weight %, preferably up to about 70 weight %, even more preferably up to about 50 weight % with the balance being made up of the semi-crystalline polymer. (wt % is based upon the weight of the blend) In an alternate set of preferred embodiments the rubbery thermoplastic copolymer is present at about 0.5 to about 45 wt %, even more preferably 1 to about 30 wt %, even more preferably about 10 to about 25 wt %, with the balance being made up by the semi-crystalline polymer.

Preferred semi-crystalline polymers that may be blended or combined with the rubbery copolymers include propylene homopolymers and copolymers. The homopolymers preferably have about 95% or more heptane insolubles, more preferably about 97% or more heptane insolubles (Insolubles measured on bulk polymer samples dried at 100° C. in a vacuum oven prior to boiling in n-heptane for 1.5 hours. Thereafter samples are vacuum dried, rinsed with acetone, dried further in a vacuum oven at 100° C. and thereafter heated in a muffle furnace for 8 hours at 1100° F. (593° C.). Heptane insolubles=100×(weight of sample after heating in muffle furnace divided by weight of the sample prior to combining with n-heptane).) The copolymers may be copolymers of propylene with any aliphatic or aromatic cyclic or branched olefin, preferably ethylene or any $C_4$ to $C_{100}$ α-olefin, preferably ethylene or any $C_4$ to $C_{20}$ α-olefin. For the purposes of this invention ethylene is considered an α-olefin. Such propylene copolymers and homopolymers are well known in the art and are commercially available under many trade names.

Rubbery copolymers with lower flexibility can be made by incorporating rigid or bulky comonomers into the polymer chains. For example the rubbery copolymer can be an alpha-olefin, preferably ethylene or propylene, with a cyclic olefin, preferably norbornene and the like, or styrene or the like. Preferred rubbery thermoplastic copolymers and methods to make them are disclosed and claimed in U.S. patent application Ser. No. 08/005,676, filed Jan. 19, 1993 (now published as WO 9417113, pub. Aug. 11, 1994), which is incorporated by reference herein. Preferred rubbery thermoplastic copolymers of an α-olefin and a cyclic olefin which are blended with the polypropylene described above are preferably copolymers which can be made, for example, by polymerizing cyclic olefin comonomers with one or more α-olefins in the presence of a coordination catalyst, preferably a single site catalyst. Preferred rubbery thermoplastic copolymers generally comprise from about 5 to about 30 mole percent of the cyclic comonomer, preferably from about 10 to about 20 hole percent of the cyclic comonomer. Preferred rubbery thermoplastic copolymers have a high molecular weight up to 2,000,000 or more, preferably from about 30,000 to about 1,000,000, even more preferably from about 50,000 to about 500,000, even more preferably 80,000 to about 250,000. (As used herein, molecular weight refers to the weight average molecular weight ($M_w$) unless otherwise indicated.) In preferred embodiments the rubbery thermoplastic copolymers may have a relatively narrow molecular weight distribution (MWD), i.e. ($M_w/M_n$) of less than about 4, preferably less than about 2. The rubbery thermoplastic copolymers generally have a glass transition temperature (Tg) in the range of −50° C. to 50° C., preferably −15° C. to about 25° C. As used herein, $T_g$ is determined by differential scanning calorimetry (DSC) under ASTM E 1356.

The rubbery copolymers also have a number of unusual properties which make them rather desirable for blends with polypropylene and other semi-crystalline copolymer, such as toughness and optical clarity combined with elasticity and good recovery after elongation. (As used herein, ultimate tensile strength, elongation at break, and recovery are determined at 25° C. using procedures in accordance with ASTM D-412, unless otherwise noted.)

In addition to having a long statistical chain segment length, the preferred rubbery thermoplastic copolymers have:

1) an elongation at break of 300% or more and especially of 400% or more;

2) a tensile strength at 150% elongation of at least 800 psi (5.5 MPa), preferably at about 1000 psi (6.8 MPa);

3) an elastic recovery of at least 70% after 10 minutes relaxation from 150% elongation, more preferably recovery of at least 80%;

4) an ultimate tensile strength of at least 2500 psi (17.2 MPa), more preferably above 3500 psi (24.1 MPa) and/or 5) a surface tension of about 33 dynes/cm or more, preferably about 37 dynes/cm or more.

The rubbery copolymers described above are also unique in that they remain elastic well above their glass transition temperatures and remain ductile well below their Tg. In general, the copolymer remains rubbery at temperatures above the approximate $T_g$ (as measured by DSC) of the copolymer, for example, from the $T_g$ (−50° C. to 50° C.) to above 100° C., preferably above 150° C. In another preferred embodiment the rubbery copolymer is elastic over the temperature range of from its Tg to 100° C. above its Tg, preferably over the range of from its Tg to 150° C. above its Tg. This unusual elasticity may also be reflected by a rubbery storage modulus over this temperature range. The rubbery storage modulus of the copolymers is readily observed as a plateau between about 1 and about 100 MPa by dynamic mechanical thermal analysis (DMTA) at a frequency of 1 or 10 Hz with a 2° C./min temperature ramp using commercially available DMTA equipment, for example, from Polymer Laboratories, Inc. The ductile-brittle transition can be measured by ASTM D-746 and although the rubbery thermoplastic copolymers may have a Tg of −5° C. to 5° C. as measured by DSC, they remain ductile to temperature below −20° C., and even to temperatures below −30° C.

If desired, the rubbery modulus can be extended to higher or lower temperatures by the optional use of crosslinking, plasticizing additives, or a combination of crosslinking and plasticizers. In general, plasticizers tend to lower the temperature at which the copolymer becomes brittle, while crosslinking raises the temperature at which the copolymer will flow or otherwise suffer a significant reduction in strength.

Surface tension is measured by using standard treatment solutions well known in the art (ASTM D2578-94). ASTM D2578-94 is hereby incorporated by reference. A typical Ethylene-norbornene copolymer having about 10 mol % norbornene has a surface tension of about 41 dynes/cm and typical polypropylene has a surface tension of about 30 or 31 dynes/cm.

The α-olefin(s) which are copolymerized with the cyclic olefin(s) to make the rubbery thermoplastic copolymer can be any unsaturated, copolymerizable monomer having at least 2 carbon atoms, or mixture or combination thereof. Typically, the α-olefin is a substituted or unsubstituted $C_2$–$C_{20}$ α-olefin, such as, for example, ethylene, propylene, 1-butene, 1-pentene, 3-methyl-pentene-1, 4-methylpentene-1, 1-hexene, 1-heptene, 1-octene, 1-nonene, 1-decene, 1-undecene, 1-dodecene, 1-tetradecene, 1-hexadecene, 1-octadecene, 1-eicosene, 3,5,5-trimethylhexene-1, allyltrimethyl silane, and the like; or vinyl aromatic and alicyclic monomers, such as, for example, styrene, alkyl-substituted styrene, vinyl cyclohexene, and the like. The α-olefin can also be (or include) a longer α-olefin (having 10 or more carbon atoms), a branched α-olefin or a polyene, or a combination thereof; either alone as the sole α-olefin comonomer(s), or more preferably as a termonomer in combination with a $C_2$–$C_{20}$ α-olefin, particularly a $C_2$–$C_8$ α-olefin, especially ethylene, propylene or a mixture of ethylene and propylene. (As used herein the term "α-olefin" or "alpha-olefin" is intended to refer generically to longer α-olefins, branched α-olefins, and polyenes, as well as the more usual $C_2$–$C_{20}$ α-olefins. Also as used herein the term copolymer is intended to refer to polymers of two or more different monomers.)

In general, any cyclic olefin can be copolymerized with the α-olefin to produce the rubbery copolymer provided the cyclic olefin includes cyclized ethylenic or acetylenic unsaturation or ethylenic or acetylenic unsaturation pendant to the cyclic structure as in styrene or vinylcyclohexane, said unsaturation which undergoes addition polymerization in the presence of the catalyst (substantially without ring opening) so that the ring structure in which the unsaturation is present is incorporated into the polymer backbone. A method to prepare the rubbery copolymers and lengthy list of preferred cyclic monomers is disclosed in PCT publication WO/9417113, published Aug. 11, 1994, and incorporated by reference herein.

Especially preferred cyclic olefins include cyclobutene, cyclopentene, deltacyclene, norbornene, methylnorbornene, tetracyclododecene, methyltetracyclododecene, dimethyltetracyclododecene, tricyclo(4.3.0.1$^{2,5}$)-3-decene, and pentacyclo(4.7.0.1$^{2,5}$.0$^{8,13}$.1$^{9,12}$). Of these, norbornene is preferred for its ready commercial availability and effectiveness.

Polyenes having two or more double bonds can optionally be used in a relatively minor proportion to impart higher molecular weight to the copolymer and/or provide residual pendant side chain unsaturation for functionalization or crosslinking. Where the polyenes can participate in polymerization at two (or more) sites, these monomers tend to promote chain extension which can double or quadruple the molecular weight at low incorporation rates, and also raise the upper temperature at which the rubbery storage modulus plateau is present. Ideally the polyene is not present in such high amounts which might result in excessive crosslinking and produce insoluble gel formation. Preferably, the molecular weight is suitably increased by including the optional polyene in the copolymer at from 0.5 to 3 mole percent.

Suitable polyenes include, for example, α,ω-dienes having from 5 to 18 carbon atoms, such as 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, or the like.

When two (or more) of the double bonds are sufficiently reactive under the particular reaction conditions to participate in the polymerization reaction, suitable optional polyenes generally also include other linear or branched aliphatic dienes and trienes, monocyclic dienes and trienes, bicyclic dienes and trienes, polycyclic dienes, aromatic dienes, and the like. Specific representative examples of non-conjugated polyenes include 1,4-hexadiene, 6-methyl-1,4-heptadiene, 4-isopropyl-1,4-hexadiene, 4-methyl-1,4-hexadiene, 5-methyl-1,4-hexadiene, 4-ethyl-1,4-hexadiene, 4-isopropyl-1,4-hexadiene, 6-phenyl-4-propyl-1,4-hexadiene, 4,5-dimethyl-1,4-hexadiene, 6-phenyl-1,4-hexadiene, 5-methyl-1,5-octadiene, 6-methyl-1,5-octadiene, 6-methyl-1,5-heptadiene, 5,7-dimethyl-1,5-octadiene, 4,5-dipropyl-1,4-octadiene, 5-propyl-6-methyl-1,5-heptadiene, 5-ethyl-7-methyl-1,6-octadiene, 1,5-hexadiene, 1,6-heptadiene, 1,6-octadiene, 1,7-octadiene, 1,8-nonadiene, 1,8-decadiene, 1,9-decadiene, and 1,10-undecadiene; dicyclopentadiene, tricylopentadiene, 1-vinyl-4-(1-propenyl)-cyclohexane, 4-methylcyclo-1,4-octadiene, 4-methyl-5-propylcyclo-1,4-octadiene, 5-methylcyclopentadiene, 4-methyl-5-ethyldicyclopentadiene, 5-isopropyldicyclopentadiene, 1,5,9-cyclododecatriene, 4-(1-butenyl-2)-styrene, 4-2-butene-2-yl)-styrene and trans-1,2-divinylcyclobutane, 5-ethylidenenorbornene-2, 5-propylidenenorbornene-2, 5-butylidenenorbornene-2, 5-isopropylidene-norbornene-2, 2-methyl-2,5-norbornadiene, 5-methyl-2,5-norbornadiene, 2-propyl-2,5-norbornadiene, 5-methylene-2-norbornene, 5-(2-butenyl)-2-norbornene, 3-heptyl-2,5-norbornadiene, 2-ethyl-3-propyl-2,5-norbornadiene, 2-(1',5'-dimethylhexene-4-yl)-2,5-norbornadiene, dicyclopentadiene, 5-isopropyldicyclopentadiene, 5-isopropylidenebicyclo(2.2.2)octene-2, 5-ethylidenebicyclo(2.2.2)octene-2, 5-butylidenebicyclo(2.2.2)octene-2, 2-ethylbicyclo(2.2.2)octadiene-2,5, 2-methyl-3-ethylbicyclo(2.2.2)octadiene-2,5, 2-hexylbicyclo(2.2.2)octadiene-2,5, 2-(1',5'-dimethylhexenyl-4)bicyclo(2.2.2)octadiene-2,5, 1-isopropylidenebicyclo(4.4.0)decadiene-2,6, 2-isopropylidenebicyclo(4.4.0)decene-6, 2-ethylidenebicyclo(4.4.0)decene-6, 3-ethylidenebicyclo(3.2.0)heptadiene-2,6, 3-methylbicyclo(3.3.0)octadiene-2,6, 3-methyltetrahydroindene, 6-methyltrahydroindene, 2-propyltetrahydroindene, 1-isopropylidenetetrahydroindene, 1-(1'-phenyl)-ethylidenetetrahydroindene and the like.

In a preferred embodiment, the polymerization methodology is practiced in the manner and with the catalyst systems referred to, disclosed, and described in the following references: U.S. Pat. No. 5,055,438; U.S. Pat. Nos. 5,507,475; 5,096,867; WO 92 00333; U.S. Pat. No. 5,264,405; U.S. Pat. No. 5,324,800; CA 1,268,753; U.S. Pat. No. 5,017,714; 5,240,894; U.S. Pat. No. 5,198,401; U.S. Pat. No. 5,153,157; WO 94 03506; EPA 520,732, pub Dec. 30, 1992; EPA 129,368, pub. Dec. 27, 1984; and EPA 277,003 & 277,004, pub. Jun. 3, 1988, which are hereby incorporated herein by reference.

Generally, the preferred catalyst systems employed in preparing the copolymer of the invention can comprise a complex formed upon admixture of a Group 4 transition metal component with an activating component. The catalyst system can be prepared by addition of the requisite transition metal and alumoxane components, or a previously cationically activated transition metal component, to an inert solvent in which olefin polymerization can be carried out by a solution, slurry or bulk phase polymerization procedure.

Optimum results are generally obtained when the Group 4 transition metal compound is present in the polymerization diluent, in a concentration of preferably from about 0.00001 to about 10.0 millimoles/liter of diluent and the activating component is present in an amount to provide a molar activating component to transition metal ratio of from about 0.5:1 to about 2:1 or more, and in the case of alumoxane, the molar alumoxane to transition metal can be as high as 20,000:1. Sufficient solvent is normally used so as to provide adequate heat transfer away from the catalyst components during reaction and to permit good mixing.

The catalyst system ingredients, that is, the transition metal, the alumoxane and/or ionic activators, and polymerization diluent can be added to the reaction vessel rapidly or slowly. The temperature maintained during the contact of the catalyst components can vary widely, such as, for example, from −100° C. to 300° C. Greater or lesser temperatures can also be employed. Preferably, during formation of the catalyst system, the reaction is maintained within a temperature of from about 25° C. to 100° C., most preferably about 25° C.

In a preferred embodiment, the catalyst system is utilized in the liquid phase (slurry, solution, suspension or bulk phase or combination thereof), high pressure fluid phase or gas phase (where the α-olefin and cyclic olefin are sufficiently volatile, e.g. up to $C_8$) for copolymerization of α-olefin and cyclic olefin. These processes may be employed singularly or in series. The liquid phase process comprises the steps of contacting α-olefin and cyclic olefin with the catalyst system in a suitable polymerization diluent and reacting said monomers in the presence of said catalyst system for a time and at a temperature sufficient to produce a copolymer of high molecular weight. Conditions most preferred for the copolymerization of α-olefin are those wherein α-olefin is submitted to the reaction zone at pressures of from about 0.019 psi (0.1 KPa) to about 50,000 psi (345 MPa) and the reaction temperature is maintained at from about −100° C. to about 300° C. The reaction time is preferably from about 10 seconds to about 4 hours.

One example of polymerization for production of the α-olefin/cyclic olefin copolymer is as follows: in a clean, dry and purged stirred-tank reactor containing solvent and optional scavenger, liquid comonomer is introduced, such as 2-norbornene. The catalyst system is introduced via nozzles in either the vapor or liquid phase. Feed ethylene (or other olefin) gas is introduced either into the vapor phase of the reactor, or sparged into the liquid phase as is well known in the art. The reactor contains a liquid phase composed substantially of solvent, liquid comonomer, together with dissolved ethylene gas, and a vapor phase containing vapors of all monomers. The reactor temperature and pressure may be controlled via reflux of vaporizing comonomer (autorefrigeration), as well as by cooling coils, jackets etc. The polymerization rate is generally controlled by the concentration of catalyst. The ethylene and comonomer contents of the polymer product are determined by NMR and manipulating the ratio of ethylene to comonomer in the reactor.

Alternatively, the α-olefin/cyclic olefin copolymer can be prepared by a high pressure process. The high pressure polymerization is completed at a temperature from about 105° C. to about 350° C., preferably from about 120° C. to about 250° C., and at a pressure of from about 100 bar to about 3200 bar, preferably from about 200 bar (20 MPa) to about 1300 bar (130 MPa), in a tubular or stirred autoclave reactor. After polymerization and catalyst deactivation, the product copolymer can be recovered using conventional equipment for polymer recovery, such as, for example, a series of high and low pressure separators wherein unreacted α-olefin, and unreacted cyclic olefin in some instances, particularly when the comonomer is relatively volatile, can be flashed off for recycle to the reactor and the polymer obtained extruded in an underwater pelletizer. An advantage of the high pressure process is that the flashing off of the cyclic olefin is relatively effective, particularly at the ratio of cyclic olefin: α-olefin used in the copolymerization to obtain the desired comonomer incorporation in the copolymer. Pigments, antioxidants and other known additives and fillers, as are known in the art, can be added to the polymer.

The copolymerization process can be a continuous or batch reaction. Typically, the continuous process, where reactants are continuously fed to the reactor and product continuously withdrawn, is preferred in commercial production facilities for economic reasons. The continuous process also has the advantage of promoting more uniform comonomer incorporation into the polymer.

As before noted, any suitable coordination catalyst system can be used. Preferably, however, the catalyst system has the ability to incorporate a relatively high content of the comonomer. The catalyst preferably has a relatively low α-olefin:cyclic olefin reactivity ratio less than about 300, more preferably less than 100, and especially from about 25 to about 75. Accordingly, the selection of the transition metal component, and other catalyst system components, is another parameter which may be utilized as a control over the α-olefin content of a copolymer with a reasonable ratio of α-olefin to cyclic olefin feed rates.

Preferred catalyst systems include:

$Cp_2ZrMe_2$ combined with DMAH B(pfp4);

$Cp_2ZrCl_2$ combined with MAO;

$Cp_2HfMe_2$ combined with DMAH B(pfp4);

$Cp_2HfCl_2$ combined with MAO;

$Me_2Si$ bis(Ind)$HfMe_2$ combined with DMAH B(pfp$_4$);

$Me_2Si$ bis(Ind)$HfCl_2$ combined with MAO;

Dimethylsilyl(tetramethyl-cyclopentadienyl) (amidocyclododecyl) titanium dichloride combined with MAO;

Dimethylsilyl(tetramethyl-cyclopentadienyl) (amidocyclododecyl) titanium dichloride combined with DMAH B (PfP$_4$);

$Me_2Si(H_4Ind)ZrCl_2$ combined with MAO; and $Me_2Si(H_4Ind)ZrMe_2$ combined with DMAH B(pfp$_4$).

Abbreviations: Cp=cyclopentadienyl, Me=methyl, DMAH B(pfp$_4$)=dimethylanilinium tetra(perfluorophenyl) borate, MAO=methylalumoxane, and Ind=indenyl.

In a preferred embodiment rubbery α-olefin/cyclic olefin copolymer (preferably an ethylene/norbornene copolymer) would be polymerized by the following procedure: A 1-liter or 2-liter autoclave reactor equipped with a paddle stirrer, an external water or steam jacket for temperature control, a regulated supply of dry nitrogen, ethylene, propylene, toluene and hexane, and a septum inlet for introduction of comonomer, transition metal compound, co-catalyst and scavenger solutions would be dried and purged thoroughly prior to use. Optionally solvent, if used, would be introduced to the reactor (typically toluene or hex). A quantity of cyclic olefin (typically in toluene or a hexanes solvent), optionally a scavenger would be added by cannula (typically an AlR$_3$, preferably TEAL or TIBA, most preferably TIBA) and the ethylene or propylene monomer (as a liquid or gas) would be introduced into the reactor. The reactor would then heated to between 30° C.–80° C. and a toluene solution of the transition metal compound, previously activated by the co-catalyst, will be introduced into the system by cannula using high pressure nitrogen or solvent. The polymerization reaction would be generally conducted for 10 to 120 minutes. The reaction will be halted by rapidly cooling and venting the system. The resulting polymer would be recovered by precipitation in methanol and/or isopropanol, filtration and drying the polymer in vacuo for about 12–48 hours at ambient temperature up to 100° C.

Scavengers, when used, would be 2.0 molar solutions of triisobutyl aluminum (TIBA), trimethyl aluminum (TMA), diisobutyl aluminum (DiBAL) or triethyl aluminum (TEA). Possible transition metal compounds include dimethylsilyl bis(indenyl) hafnium dimethyl, dimethylsilyl(tetramethylcyclopentadienyl) (amidocyclododecyl) titanium dichloride, bis(cyclopentadienyl) zirconium dimethyl or dimethylsilyl bis(tetrahydroindenyl) zirconium dichloride.

The blends, including the cured blends discussed below, produced herein are useful in any application where rubber toughened polypropylene has been used in the past. For example the blend may be molded, blown, cast, extruded or otherwise formed into articles. Examples include automotive trim, automotive bumpers, packages, containers, films, sheets, strips and the like.

EXAMPLES

Ethylene/norbornene copolymer (ENB1) was produced according to the following procedure:

About 15.5 g norbornene dissolved in 400 ml hexanes were added to a one liter Zipperclave reactor equipped with a paddle stirrer; an external water or steam jacket for temperature control; a regulated supply of dry nitrogen, ethylene, propylene, toluene and hexane; and a septum inlet for introduction of comonomer, transition metal compound, co-catalyst and scavenger solutions the reactor was dried and purged thoroughly prior to use. Ethylene was introduced at a pressure of 50.0 psig (345 kPa) and the reactor was heated (30° C.) and stirred. 23.0 mg of the bis (cyclopentadienyl) zirconium dimethyl (a molar excess) and 9.6 mg of dimethylanilinium tetra(perfluorophenyl)borate were mixed in toluene (2–3 ml) and left to activate for 10 minutes. This two-phase oil/toluene mixture was sealed in a vial with septa, the vial was connected to the reactor via cannula and then pressurized with N$_2$ to the reactor. The polymerization reaction was conducted for 19 minutes, yielding 3.91 g of copolymer. ENB2 and ENB3, were made following the procedure above except for the differing conditions noted in Table 1 which reports the polymerization and some physical data.

TABLE 1

Rubbery Ethylene/Norbornene Copolymer Data

|  | ENB1 | ENB2 | ENB3 | ENB4 |
|---|---|---|---|---|
| $Cp_2ZrMe_2$ (mg) | 23 | 16 | 42 | V |
| DMAH B(pfp$_4$) (mg) | 9.6 | 20 | 48 | V |
| Temp (°C.) | 40 | 50 | 40 | 40 |
| $C^-_2$(psi/kPa) | 50/345 | 36/248 | 38.8/268 | 35/241 |
| Norbornene | 15.5 g | 38.8 g | 38.8 g | 40 g |
| Time (hr) | 0.33 | 0.33 | 0.25 | V |
| Yield (g) | 3.91 | 52.0 | NA | V |
| Act. (g/g-h) | 24,300 | 25,00 | NA | V |
| Mw | 67,000 | 110,000 | 150,000 | 72,000 |
| Mol % NB* | 11.9 | 11.7 | 8.7 | 14.0 |
| Stress @ (psi/MPa) | 3140/22 | NA | NA | 3840/26 |
| Elong. # (%) | 535 | NA | NA | 443 |

Elong. # = elongation at break as measured by ASTM 412.
Stress @ = stress at maximum load as measured by ASTM 412.
Mol % NB = mole percent of norbornene in the polymer as measured by $^{13}$CNMR and/ or $^1$HNMR.
V - Variable. ENB4 was a composite blend of many small batch runs. The values given are for the final blended material.
ENB5 is ENB4 with a stabilizer package of IRGAPHOS 168 ™ (750 ppm) and IRGANOX 1076 ™ (1500 ppm) added.
NA - Data Not available.

Several polypropylenes were made or purchased. These were:

(1) PP1—high crystallinity, brittle, isotactic PP (98.7% heptane insolubles) made using a supported TiCl$_4$/MgCl catalyst activated with a methylcyclohexyldimethoxysilane donor in typical commercial slurry conditions.

(2) PP2—a commercially available isotactic PP homopolymer sold under the trade name ESCORENE PP1012™ by Exxon Chemical Company having a melt flow rate of 5.0 g/10 min (ASTM D 1238-65T condition L);

(3) PP3—a commercially available polypropylene homopolymer sold under the trade name Escorene PD 3345E from Exxon Chemical Company, having a melting point of 165° C. and a melt flow rate of 35 g/10 min (ASTM D 1238-65T condition L);

(4) PP4—a commercially available polypropylene homopolymer sold under the trade name Escorene PD 4193 from Exxon Chemical Company, having a melt flow rate of 7.3 g/10 min (ASTM D 1238-65T condition L); and (5) PP5—a low melt flow rate (MFR) atactic PP made by polymerizing propylene in the presence of Me$_2$Si[Me$_4$CpN (C$_{12}$H$_{23}$)]TiCl$_2$ and methylalumoxane in solution conditions.

EXAMPLE 2

Several blends, A–H, were physically mixed using a Brabender Counter rotating mixer using the small mixing head (45 ml). Mixing conditions were as follows:

The head was preheated to 190° C. for 5 minutes. A manually blended mixture was fed into the mixing chamber with screws rotating at 60 rpm. The mixture was blended for 5 minutes and then removed. The blends were then compression molded. The blends and the test data are reported in Table 2.

Several blends (M–T) were mixed and pelletized using two passes through a single screw extruder with a 200 mesh screen pack. The pellets were injection molded into test pieces.

TABLE 2

| Blend | PP (g) | ENB (g) | wt. % rubber |
|---|---|---|---|
| A | PP5 (0.032) | ENB1 (0.6) | 95% |
| B | PP5 (0.07) | ENB1 (0.6) | 90% |
| C | PP5 (0.106) | ENB1 (0.6) | 85% |
| D | PP5 (0.4) | ENB1 (0.6) | 60% |
| E | PP5 (0.6) | ENB1 (0.6) | 50% |
| F | PP3 (36.31) | ENB2 (90.4) | 20% |
| G | PP3 (27.15) | ENB2 (18.14) | 40% |
| H | PP4 (34.92) | ENB3 (11.64) | 25% |
| M* | PP1 (10 lbs) | none | 4% |
| N* | PP1 (9.6 lbs) | ENB5 (181.6 g) | 4% |
| O* | PP1 (9.6 lbs) | VISTALON 457 ™ (181.6 g) | 4% |
| P | PP2 (9.6 lbs) | ENB5 (181.6 g) | 4% |
| Q | PP2 (9.6 lbs) | Vistalon 719 ™ (181.6 g) | 4% |
| R | PP2 (9.6 lbs) | Vistalon 404 ® (181.6 g) | 4% |
| S | PP2 (9.6 lbs) | Vistalon 457 ™ (181.6 g) | 4% |
| T | PP2 (10 lbs) | none | 4% |

* = 550 ppm of BHT and 800 ppm of calcium stearate were added as a stabilizing package.

The copolymers were selectively tested for norbornene content by carbon nuclear magnetic resonance (CNMR) and/or proton NMR ($^1$HNMR); molecular weight (M$_w$) and molecular weight distribution (M$_w$/M$_n$) by gel permeation chromatography; and glass transition temperature (T$_g$) by differential scanning calorimetry (DSC) using ASTM E 1356. The DMTA was done on a Polymer Laboratories, Inc. DMTA apparatus using a single cantilever head and a 2° C./min. temperature ramp according to the manufacturer's recommended procedures at 1 Hz and 10 Hz from −120° C. to 150° C. Physical properties such as tensile strength at break; elongation at break; tensile strength at 150% strain; and recovery (100 minus tension set) were measured according to ASTM 638. Physical properties were measured on an Instron tensile testing apparatus at 4 in./min. (200%/min.), and the recovery data at 20 in./min. (1000%/min.). Testing was at ambient conditions unless otherwise indicated. Youngs modulus and yield stress were measured by a ASTM 638. Flexural strength was measured by ASTM 638. 1% Secant flexural modulus was measured by ASTM D 790. Gardner impact was measured by ASTM D 5420. Tm was measured by DSC, second melt. Mold shrinkage is measured by ASTM D 955. 60° gloss is measured by ASTM 2457.

The blends were injection molded into plaques and tested for tensile at break, elongation at break, yield stress, Young's Modulus, flex strength, 1% Secant flexural modulus, Gardner Impact at 23° C., melting point (Tm), crystallization temperature (Tc), mold shrinkage and 60° gloss. The results are presented in Table 3a and 3b.

TABLE 3a

| Blend | Tensile at break (psi/MPa) | Elong. at break (%) | Yield stress (psi/MPa) | Young's modulus (psi/MPa) | Flex Strength (psi/MPa) |
|---|---|---|---|---|---|
| M | 3491/24.0 | 730 | 5189/35.7 | 109723/756.5 | 7164/49.3 |
| N | 3193/22.0 | 656 | 5041/34.7 | 109889/757.6 | 6963/48.0 |
| O | 3018/20.8 | 771 | 4758/32.8 | 98296/677.7 | 6409/44.1 |
| P | 3233/22.2 | 889 | 4712/32.4 | 91651/631.9 | 5855/40.4 |
| Q | 2759/19.0 | 817 | 4259/31.2 | 70965/489.3 | 5652/38.9 |
| R | 3143/21.6 | 928 | 4437/30.5 | 83668/576.8 | 5383/37.1 |
| S | 3093/21.3 | 950-NB | 4404/30.3 | 71120/490.3 | 5476/37.7 |
| T | 3337/23.0 | 950-NB | 4794/33.0 | 88281/608.6 | 5883/40.5 |

NB = no break

TABLE 3b

| Blend | Secant 1 mod. (psi/MPa) | Gardner impact (in/lbs) | Tm (°C.) | Tc (°C.) | Mold shrinkage (%) | 60° gloss (%) |
|---|---|---|---|---|---|---|
| M | 252727/1743 | 8.2 Br | 168/160 | 114 | 1.35 | 87.6 |
| N | 247397/1706 | 61 BrSh | 168/160 | 115 | 1.36 | 87.1 |
| O | 230029/1586 | 197 DuSh | 168/160 | 116 | 1.29 | 87.0 |
| P | 200500/1382 | 167 DuSh | 160 | 115 | 1.3 | 87.4 |
| Q | 193079/1331 | 163 DuSh | 161/144 | 113 | 1.3 | 86.9 |
| R | 183279/1264 | 167 Du | 166/155 | 112 | 1.25 | 86.7 |
| S | 192026/1324 | 177 Du | 166/155 | 113 | 1.22 | 86.8 |
| T | 201100/1387 | 118 DuSh | 161.4 | 120.2 | 1.21 | 87.4 |

Du = ductile, Sh = shatter, Br = brittle.

Izod tests were also conducted according to ASTM D-256. The results are reported in table 4.

TABLE 4

(Izod impact results in ft-lbs/in (J/cm))

| Blend | Notched 23° C. | Unnotched 23° C. | Unnotched −18° C. | Unnotched −23°C. | Unnotched −40°C. |
|---|---|---|---|---|---|
| M | 0.65/4.4 | 32.7/225.4 | 4.0/27.5 | 3.3/22.7 | 3.8/26.2 |
| N | 0.68/4.6 | 30.4/209.6 | 4.5/31.0 | 3.6/24.8 | 2.8/19.3 |
| O | 0.88/6.0 | 30.0/206.8 | 5.7/39.3 | 4.4/30.3 | 4.5/31.0 |
| P | 0.47/3.2 | 22.5/155.1 | 3.1/21.3 | 2.8/19.3 | 2.8/19.3 |
| Q | 0.60/4.1 | 30.3/208.9 | 3.2/22.0 | 2.7/18.6 | 3.1/21.3 |
| R | 0.70/4.8 | 30.1/207.5 | 4.0/27.5 | 4.4/30.3 | 3.4/23.4 |
| S | 0.74/5.1 | 30.2/208.2 | 3.8/26.2 | 4.2/28.9 | 3.9/26.8 |
| T | 0.66/4.5 | 27.4/188.9 | 4.1/28.2 | 4.0/27.5 | 3.8/26.2 |

Blends M through T compared the physical and mechanical properties of two polypropylenes blended with E/NB rubber and different commercial EP rubbers to the non-blended PP. Both rubbers provide significant impact resistance improvement, but the E/NB modified polymers show no loss of tensile strength or flex strength as the EP modified polymers do (Table 3 and 4). In addition there is no loss of surface gloss incurred by adding E/NB rubber as there is when adding EP rubber (Particularly evident with the commercial PP blends P through T). The mold shrinkage results were inconclusive at these rubber levels. The E/NB modified polymers retained low temperature impact properties as measure by the IZOD impact test (Table 4) down to somewhere between −18° and −29° C. but lost impact resistance at −40° C.

Typically there is an inverse relationship between strength and impact resistance in a blend of semi-crystalline polymer and rubbery copolymer. (As more rubber is added to the semi-crystalline polymer, its impact properties improve, but strength is lost.) This relationship may be represented by a line drawn between the Modulus and Gardner Impact values for homopolypropylene and the values of 160.000 psi Modulus and 320 ft-lbs Gardner Impact. Most of the commercial impact modified PP's have properties that fall on or close to this line. It is desirable to find impact modifying rubbers that result in values that are above and to the right of this line.

FIG. 1 plots 1% Secant flexural modulus (kpsi) vs. 23° C. Gardner Impact (ft-lb) for five compositions.

| Symbol | Description |
|---|---|
| ■ | ESCORENE ™ 1012 polypropylene |
| ● | Blend P |
| ▲ | Blend Q |
| X | Blend R |
| Z | Blend S |

Blends Q, R, and S, all modified with commercially available elastomers, have properties that fall close to the line connecting the two squares in FIG. 1, which represents the expected behavior. Blend P, an example of the present invention, had the greatest impact improvement without a loss of strength, and as a result falls well above the expected behavior line. This is a significant improvement that will be magnified in blends with higher rubbery thermoplastic copolymer content.

In summary, the instant blends provide impact resistance to PP without loss of tensile strength, flex strength, or surface gloss as the commercial EP rubber blends do. The instant blends provide this impact resistance even at below ambient temperatures, in a temperature range that is commercially significant.

It is well known on the art that crosslinking of the rubber phase after it has been dispersed in the semi-crystalline polymer can improve the toughness of the blend. Crosslinking by peroxide cure treatment, E-beam treatment, or gamma irradiation treatment acts to increase the molecular weight of the rubber phase and prevent migration or aggregation of the rubber particles. In another embodiment of this invention the alpha-olefin/cyclic olefin rubber phase of the blend is crosslinked, preferably using a peroxide cure treatment to increase the molecular weight of the rubber phase, and thereby the overall toughness of the PP blend. Typical peroxides include di-cumyl peroxide and di-t-butyl peroxide.

EXAMPLE 3

11.6 g of PP4 was physically admixed with 11.6 g of ENB3 then poured into a preheated Brabender with 0.1201 g of di-t-butyl peroxide (98.5% pure). The components were blended for ten minutes at 190 C. using a small 45 g mixing head. The cured blend was then tested for physical properties. The data for the cured blend, one uncured blend and neat polypropylene are summarized in Table 5.

TABLE 5

Strain Behavior of PP/Rubber Blends Before And After Peroxide Cure

| Host Polymer MFR | Rubber ID Weight % Rubber | Approximate Young's Modulus (psi) | % Strain at Maximum Load | Energy-To-Break (lb-in) | Tensile Energy Absorption (lbs/in) |
|---|---|---|---|---|---|
| PP3 (35) | None 0% | | 12 | 20 | 100 |
| PP3 (35) | ENB2 20% | 78,600 | 9 | 5 | 31 |
| PP4* (7.5) | ENB3 25% | 71,700 | 404 | 132 | 802 |

*di-t-butyl peroxide

The data show that the rubbery thermoplastic copolymer will crosslink to improve the toughness of the blends to such an extent that they are competitive in properties with commercial reactor thermoplastic olefins. The instant blends are different however because the rubbery thermoplastic copolymer has a higher packing length than the semi-crystalline polymer causing it to be excluded from the surface. Packing length is defined and measured or calculated in Fetters, L. J., Lohse, D. J., Richter, D., Witten, T. A., and Zirkel, A. Macromolecules, 1994, incorporated by reference herein. After crosslinking the rubber phase the rubber particles remain excluded from the surface causing no loss of surface properties while increasing the toughness significantly. Evidence that the rubbery copolymer is excluded from the surface is provided by X-ray photoelectron spectroscopy (XPS) which gave unperturbed, characteristic PP spectra before and after blending rubber, as well as before and after peroxide cure treatment.

As is apparent from the foregoing description, the materials prepared and the procedures followed relate to specific embodiments of the broad invention. It is apparent from the foregoing general description and the specific embodiments that, while certain forms of the invention have been illustrated and described, various modifications can be made without departing from the spirit and scope of this invention. Accordingly, it is not intended that the invention be limited thereby.

We claim:

1. A blend comprising:
   (1) about 55 to about 99.5% by weight semi-crystalline polymer; and
   (2) about 0.5 to about 45% by weight of a rubbery thermoplastic copolymer comprising an α-olefin and from about 5 to about 30 mole % of cyclic olefin, said rubbery thermoplastic copolymer:
      (a) having an Mw of at least about 30,000;
      (b) being elastic over the range of temperatures between its Tg and about 100° C. above its Tg; and
      (c) having a surface tension that is 3 dynes/cm or more different from the surface tension of the semi-crystalline polymer.

2. The blend of claim 1 wherein the α-olefin of the rubbery thermoplastic copolymer is ethylene.

3. The blend of claim 2 wherein the cyclic-olefin is norbornene, substituted norbornene or isomers thereof.

4. The blend of claim 1 further comprising a peroxide.

5. The blend of claim 1 wherein the rubbery thermoplastic copolymer has a surface tension 5 dynes/cm or more greater than the surface tension of the semi-crystalline copolymer.

6. The blend of claim 1 wherein the rubbery thermoplastic copolymer comprises ethylene and about 10 to about 30 mole % norbornene.

7. The blend of claim 1 wherein the cyclic olefin is one or more of cyclobutene, cyclopentene, deltacyclene, norbornene, methyl norbornene, tetracyclododecene, methyltetracyclododecene, dimethyltetracyclododecene, tricyclo(4.3.0.1$^{2,5}$)-3-decene, or pentacyclo(4.7.0.1$^{2,5}$.0$^{8,13}$.1$^{9,12}$)-3-pentadecene.

8. The blend of claim 1 wherein the semi-crystalline polymer is present at about 99.5 to about 75 weight percent and the rubbery thermoplastic copolymer is present at about 0.5 to about 25 weight percent.

9. An article comprising the blend of claim 1.

10. A molded part comprising the blend of claim 1.

11. An article comprising the blend of claim 4.

12. A molded article comprising a blend comprising:
   (1) about 75 to about 95.5 weight percent of semi-crystalline polymer;
   (2) about 25 to about 0.5 weight percent of a copolymer of ethylene and about 5 to about 30 mole % norbornene, said ethylene/norbornene copolymer being elastic over the range of temperatures between its Tg and about 100° C. above its Tg and said copolymer having a surface tension that is 5 dynes/cm or more greater than the surface tension of the semi-crystalline polymer; and
   (3) optionally, a curing agent.

13. A process for producing a blend comprising physically admixing:
   (1) about 55 to about 99.5% by weight semi-crystalline polymer; with
   (2) about 0.5 to about 45% by weight of a rubbery thermoplastic copolymer of an α-olefin and from about 5 to about 30 mole % of cyclic olefin said rubbery thermoplastic copolymer:
      (a) having an Mw of at least about 30,000;
      (b) being elastic over the range of temperatures between its Tg and about 100° C. above its Tg; and
      (c) having a surface tension that is 3 dynes/cm or more greater than the surface tension of the semi-crystalline polymer.

14. The process of claim 13 wherein the rubbery thermoplastic copolymer is a copolymer of ethylene and about 10 to about 30 mole % norbornene.

15. The process of claim 13 wherein the rubbery thermoplastic copolymer has a surface tension of about 5 dynes/cm or more greater than the surface tension of the semi-crystalline polymer.

16. The process of claim 13 wherein the rubbery thermoplastic copolymer has a surface tension of about 8 dynes/cm or more greater than the surface tension of the semi-crystalline polymer.

17. A blend according to claim 1 wherein the blend has been cross-linked by peroxide cure treatment.

18. The process of claim 13 wherein said rubbery thermoplastic copolymer is present in said blend in an amount of from about 1% to about 30% by weight.

19. The blend of claim 1 wherein said rubbery thermoplastic copolymer comprises from about 10 to about 20 mole % of cyclic olefin.

20. The process of claim 13 wherein said rubbery thermoplastic copolymer comprises from about 16 to about 20 mole % of cyclic olefin.

21. The blend of claim 1 wherein the rubbery thermoplastic copolymer comprises from about 10 to about 20 mole % norbornene.

* * * * *